United States Patent
Shelton et al.

(10) Patent No.: US 9,650,047 B2
(45) Date of Patent: May 16, 2017

(54) METHOD OF OPERATING A TRANSMISSION CLUTCH

(71) Applicant: Ford Global Technologies, LLC, Dearbon, MI (US)

(72) Inventors: Matthew John Shelton, Grosse Ile, MI (US); Alexander O'Connor Gibson, Ann Arbor, MI (US); James William Loch McCallum, Ann Arbor, MI (US); Stuart N. Ford, Farmington Hills, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 14/694,110

(22) Filed: Apr. 23, 2015

(65) Prior Publication Data

US 2016/0311433 A1    Oct. 27, 2016

(51) Int. Cl.
*B60W 10/02* (2006.01)
*B60W 10/06* (2006.01)
(Continued)

(52) U.S. Cl.
CPC ...... *B60W 30/18072* (2013.01); *B60W 10/02* (2013.01); *B60W 10/06* (2013.01); *B60W 50/14* (2013.01); *F16H 63/46* (2013.01); *B60W 2030/1809* (2013.01); *B60W 2050/146* (2013.01); *B60W 2510/1005* (2013.01); *B60W 2520/10* (2013.01); *B60W 2540/10* (2013.01); *B60W 2710/021* (2013.01); *B60W 2710/0655* (2013.01); *F16H 59/74* (2013.01);
(Continued)

(58) Field of Classification Search
CPC ..... B60W 2540/14; B60W 2510/0647; B60W 2510/0642; F16H 2059/746; F16H 59/68; F16H 59/74; F16H 2063/426
See application file for complete search history.

(56) References Cited

U.S. PATENT DOCUMENTS 2,765,889 A * 10/1956 Court ...................... F02D 29/00
477/73
6,186,925 B1 * 2/2001 Bellinger .............. B60W 10/02
192/103 C
(Continued)

*Primary Examiner* — Jacob S Scott
*Assistant Examiner* — Tinh Dang
(74) *Attorney, Agent, or Firm* — James Dottavio; Brooks Kushman P.C.

(57) ABSTRACT

A manual transmission is partially automated by utilizing a controller to regulate the torque capacity of the clutch. Under most circumstances, the controller manipulates the clutch according to driver manipulation of a clutch pedal to simulate a non-automated manual transmission. However, to save fuel, the controller may enter a sailing mode in which the clutch is disengaged without the driver depressing the clutch pedal. The controller exits sailing mode in response to the vehicle speed decreasing below a threshold which is a function of the currently selected gear ratio. The threshold is selected such that the engine will not stall and will be able to generate sufficient power for acceleration when the clutch is re-engaged to exit sailing mode. In order to extend the use of sailing mode, the controller may activate a downshift indicator at a slightly higher speed threshold to encourage the driver to downshift.

15 Claims, 4 Drawing Sheets

(51) Int. Cl.

| | | |
|---|---|---|
| *F16H 59/44* | (2006.01) | |
| *F16H 59/70* | (2006.01) | |
| *F16H 59/74* | (2006.01) | |
| *F16H 63/46* | (2006.01) | |
| *F16H 63/50* | (2006.01) | |
| *B60W 30/18* | (2012.01) | |
| *B60W 50/14* | (2012.01) | |
| *F16H 63/42* | (2006.01) | |
| *F16H 59/68* | (2006.01) | |

(52) U.S. Cl.
 CPC .............. *F16H 63/42* (2013.01); *F16H 63/50* (2013.01); *F16H 2059/6807* (2013.01)

(56) References Cited

U.S. PATENT DOCUMENTS

| | | | |
|---|---|---|---|
| 8,393,240 B2 * | 3/2013 | Wolterman | F16D 48/06 |
| | | | 74/473.16 |
| 8,666,594 B2 | 3/2014 | Boot | |
| 8,808,140 B2 | 8/2014 | Reed et al. | |
| 9,243,706 B2 * | 1/2016 | Fujii | F16H 63/46 |
| 9,512,916 B2 * | 12/2016 | Baumgartner | F16H 59/0204 |
| 2013/0116906 A1 | 5/2013 | Christen et al. | |
| 2013/0225362 A1 * | 8/2013 | Sato | B60K 6/445 |
| | | | 477/3 |
| 2013/0296119 A1 | 11/2013 | Reed et al. | |
| 2013/0297121 A1 | 11/2013 | Reed et al. | |

* cited by examiner

FIG. 1 - PRIOR ART

METHOD OF OPERATING A TRANSMISSION CLUTCH

TECHNICAL FIELD

This disclosure relates to the field of transmission systems. More particularly, the disclosure pertains to a manual transmission with a clutch controlled by a controller in response to movement of a clutch pedal.

BACKGROUND

A typical manual powertrain is illustrated in FIG. 1. Solid lines represent mechanical power flow through rotating shafts. Dashed lines represent control connections, which may be implemented using mechanical linkages. Engine 10 generates power at crankshaft 12 by burning fuel. The engine responds to changes in the position of accelerator pedal 14 to generate more power when the pedal is depressed further by the driver. Transmission 16 transmits power from crankshaft 12 to output shaft 18. Transmission 16 includes a friction clutch 20 and a gearbox 22 connected by input shaft 24. Gearbox 22 is capable of establishing a variety of forward speed ratios and at least one reverse speed ratio in response to driver manipulation of shifter 26. The driver controls the torque capacity of clutch 20 by manipulation of clutch pedal 28. Typically, clutch 20 is fully engaged when clutch pedal 28 is released and is fully disengaged when clutch pedal 28 is fully depressed. Differential 30 splits power from output shaft 18 between a left axle 32 driving a left wheel 34 and a right axle 36 driving a right wheel 38 while permitting slight speed differences between the axles as the vehicle turns a corner. In a typical rear wheel drive powertrain, the transmission output shaft is a driveshaft that extends to the differential. In a typical front wheel drive powertrain, the output shaft 18 may be driveably connected to the differential by a final drive gear. The transmission and differential of a front wheel drive powertrain are frequently combined into a single housing and called a transaxle.

For internal combustion engine 10 to generate power, crankshaft 12 must rotate at sufficient speed. However, when the vehicle is stationary with gearbox 22 establishing a speed ratio, input shaft 24 is also stationary. In order to start the vehicle moving, the driver controls the torque capacity of clutch 20 to transmit power from moving crankshaft 12 to stationary input shaft 24. As the vehicle accelerates the speed of input shaft 24 gradually increases until it is equal to the speed of crankshaft 12, at which point clutch 20 can be fully engaged. With clutch 20 fully engaged, the speed of crankshaft 12 is proportional to vehicle speed. As the vehicle accelerates in 1st gear, the speed of crankshaft 12 becomes excessive, necessitating a shift to 2nd gear. Gearbox 22 is not capable of changing ratios while transmitting power. Therefore, the driver shifts by disengaging clutch 20, then manipulating shifter 26 to change the gearbox ratio, then re-engaging clutch 20. Re-engagement of clutch 20 forces the crankshaft speed to become equal to input shaft speed, predominantly by changing the speed of the crankshaft.

There are times when a vehicle is moving but does not require propulsive power. For example, the vehicle may be descending a hill or may be approaching a stop sign. Even though the vehicle does not require propulsive power, the engine generally continues to use fuel and may impose negative torque tending to slow the vehicle down. Driver actions strongly influence the fuel usage and negative torque. The driver may simply release the accelerator pedal and leave the gearbox engaged in the current gear ratio with the clutch fully engaged. In this case, the engine speed will be dictated by the vehicle speed and the selected gear ratio. This causes negative torque as vehicle inertia is used to maintain the engine at this speed. Consequently, the vehicle may slow down prematurely. To compensate for slowing down prematurely, the driver may need to use fuel to re-accelerate, reducing cycle fuel economy. Alternatively, the driver may disengage the clutch and allow the engine to idle. In this state, the negative torque is minimal, but fuel is still used to maintain the engine speed at idle. If the shifts the gearbox to neutral, he may re-engage the clutch without substantially changing vehicle behavior. It is uncommon for a driver to shut the engine off while coasting. Many drivers do not take the actions that would reduce fuel consumption either due to lack of knowledge or due to the effort required.

SUMMARY OF THE DISCLOSURE

A vehicle includes a gearbox, an engine, a friction clutch, accelerator and clutch pedals, and a controller. The gearbox selectively establishes one of a set of gear ratios between a gearbox input shaft and an output shaft in response to driver manipulation of a shifter. The friction clutch is controlled by the controller to selectively couple the gearbox input shaft to an engine crankshaft. The controller is programmed to enter a sailing mode by disengaging the clutch in response to driver release of the accelerator pedal while the vehicle is moving with the clutch pedal in a released state. The controller is further programmed to exit the sailing mode by re-engaging the clutch in response to vehicle speed decreasing below a first threshold. The controller may also be programmed to activate a downshift indicator, for example illuminating a dash mounted light, in response to vehicle speed decreasing below a second speed. The first and second thresholds may each vary based on which of the set of gear ratios is currently selected and the controller may update the thresholds in response to driver manipulation of the shifter while in the sailing mode. In addition, the controller may shut off the engine while in the sailing mode and re-start the engine as part of exiting sailing mode.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
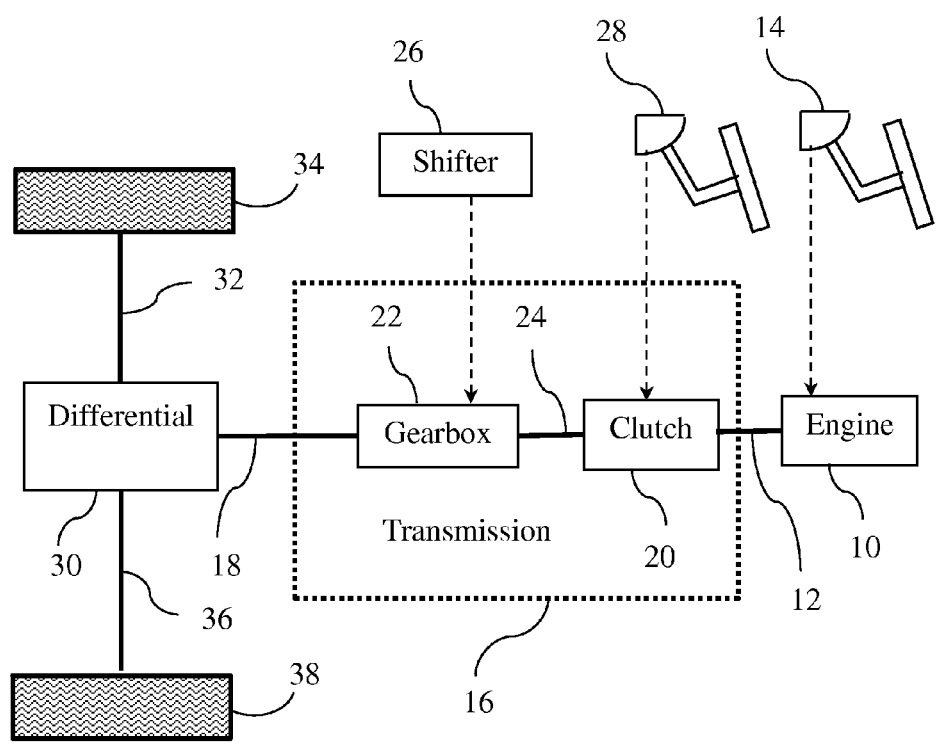
FIG. 1 is schematic illustration of a vehicle powertrain having a manual transmission.
Figure 2:
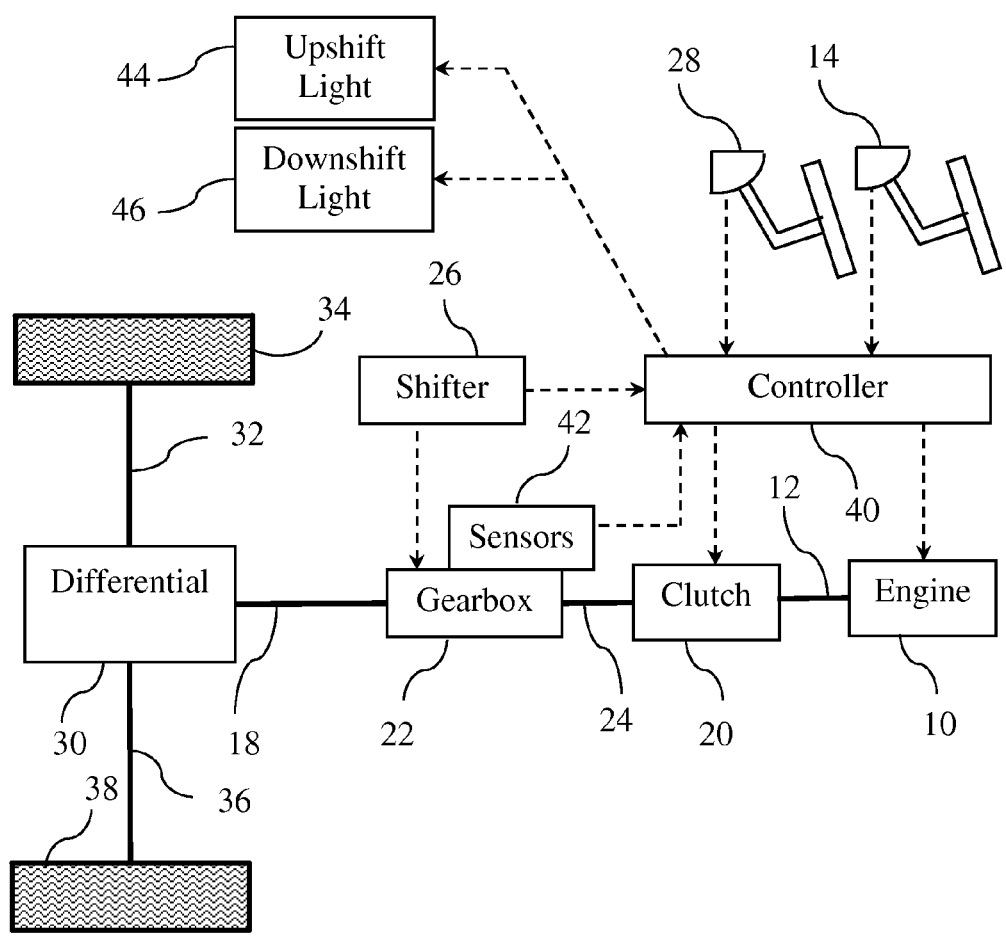
FIG. 2 is a schematic illustration of a vehicle powertrain having a manual transmission with an electronically actuated clutch.

FIG. 2 illustrates a powertrain that utilizes a controller to add features not practical in the purely manual powertrain of FIG. 1. In the powertrain of FIG. 2, engine 10 and clutch 20 do not respond directly to movement of the accelerator pedal 14 and the clutch pedal 28 respectively. Instead, controller 40 senses the position of the pedals and sends commands to the engine and clutch. In some instances, the commands may not correspond directly to driver commands as indicated by manipulation of the pedals. To assist in determining the proper commands, the controller may receive additional signals, including a signal indicating the position of shifter 26 and signals from an array of sensors 42 in gearbox 22. Although the driver retains full control over the selected gear ratio, controller 40 can suggest that the driver change gear ratios by illuminating an upshift light 44 or a downshift light 46 on the instrument panel. Controller 40 may be a single controller or multiple communicating controllers.

Figure 3:
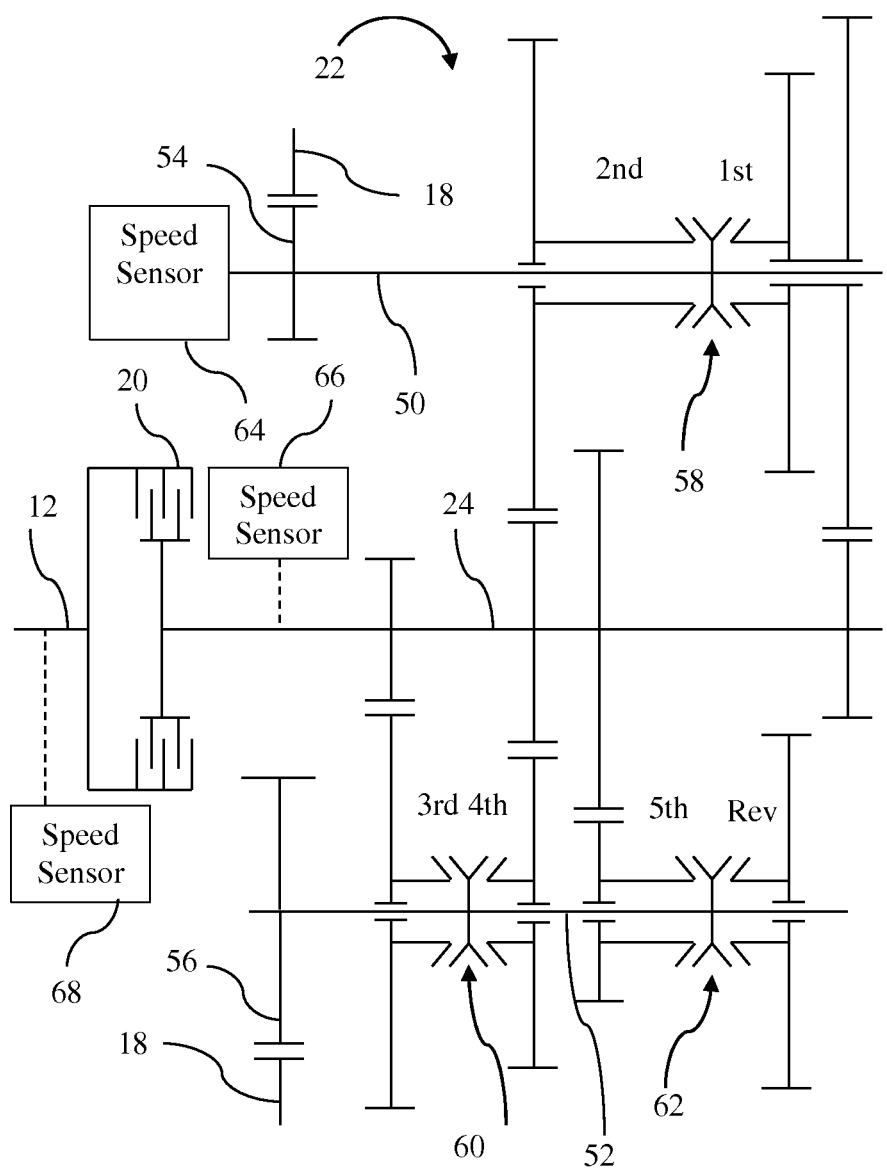
FIG. 3 is a schematic diagram of a gearing arrangement for a manual transmission.

FIG. 3 illustrates an exemplary configuration of a front wheel drive transmission. Transmission output 18 is a final drive ring gear fixed to a carrier of a differential. Two countershafts, 50 and 52 are parallel to gearbox input shaft 24. Final drive pinion gears 54 and 56 are fixed to countershafts 50 and 52 respectively and mesh continuously with output gear 18. Therefore, the speeds of the countershafts are related to the speed of output 18 by fixed ratios. A number of gears fixed to input shaft 24 mesh with corresponding gears that are supported for rotation about one of the countershafts. Particular gear ratios are engaged by moving one of the synchronizers 58, 60, or 62, to selectively couple one of these gears to one of the countershafts. A shift mechanism (not shown) moves the synchronizers in response to driver manipulation of the shifter 26.

The transmission may also include a number of sensors such as output speed sensor 64, gearbox input speed sensor 66, and engine speed sensor 68. Alternatively, controller 40 may receive speed information from other sensors directly or via other controllers in the vehicle. For example, engine speed may be reported by an engine controller via a Controller Area Network (CAN) and output speed may be determined from wheel speeds reported by an Anti-lock Brake System (ABS) The sensor area may also include sensors for quantities other than shaft speed, such as shaft torque, oil temperature, etc.

Although the nominal behavior of the controller is to position the actuator based solely on the position of the clutch pedal, the controller may depart from this behavior is some circumstances. The ability to over-ride the driver clutch pedal movement is one of the advantages of an electronically actuated clutch. One such circumstance occurs when the vehicle is coasting (neither accelerator pedal nor brake pedal depressed) and the driver leaves the transmission in gear with the clutch pedal released (which corresponds to the clutch being engaged). In this circumstance, vehicle inertia causes the engine to rotate. This causes the engine to exert drag torque which may be substantial if the engine speed is relatively high. To prevent the vehicle from decelerating unnecessarily, the controller may move the clutch actuator to a disengaged position and then control the engine to rotate at idle speed. This feature is known as sailing. Alternatively, the controller may shut the engine off to reduce fuel consumption further, which is known as Rolling Stop/Start (RSS). When the driver depresses the accelerator pedal, the controller must quickly bring the engine back to synchronous speed and then re-engage the clutch.

While in a sailing or RSS mode, the selected gear ratio continues to be determined by the position of shifter 26 which under full driver control. Controller 40 does not shift the transmission to a different gear ratio. If the vehicle speed decreases substantially while the sailing or RSS mode is active, the previously selected gear ratio may be inappropriate when the driver depressed the accelerator pedal. If the clutch had remained engaged during the deceleration, the driver would have noticed the need to select a different gear ratio based on the engine speed becoming excessively low. Unlike the situation where a driver commands a neutral condition, the driver would not be manipulating the clutch pedal in anticipation of accelerating. Therefore, nothing causes the driver to re-consider the gear selection. If the clutch is re-engaged at too low of a vehicle speed for the currently selected gear ratio, the engine will not be able to generate sufficient torque to satisfy the acceleration demand. In some cases, the engine may stall.

Figure 4:
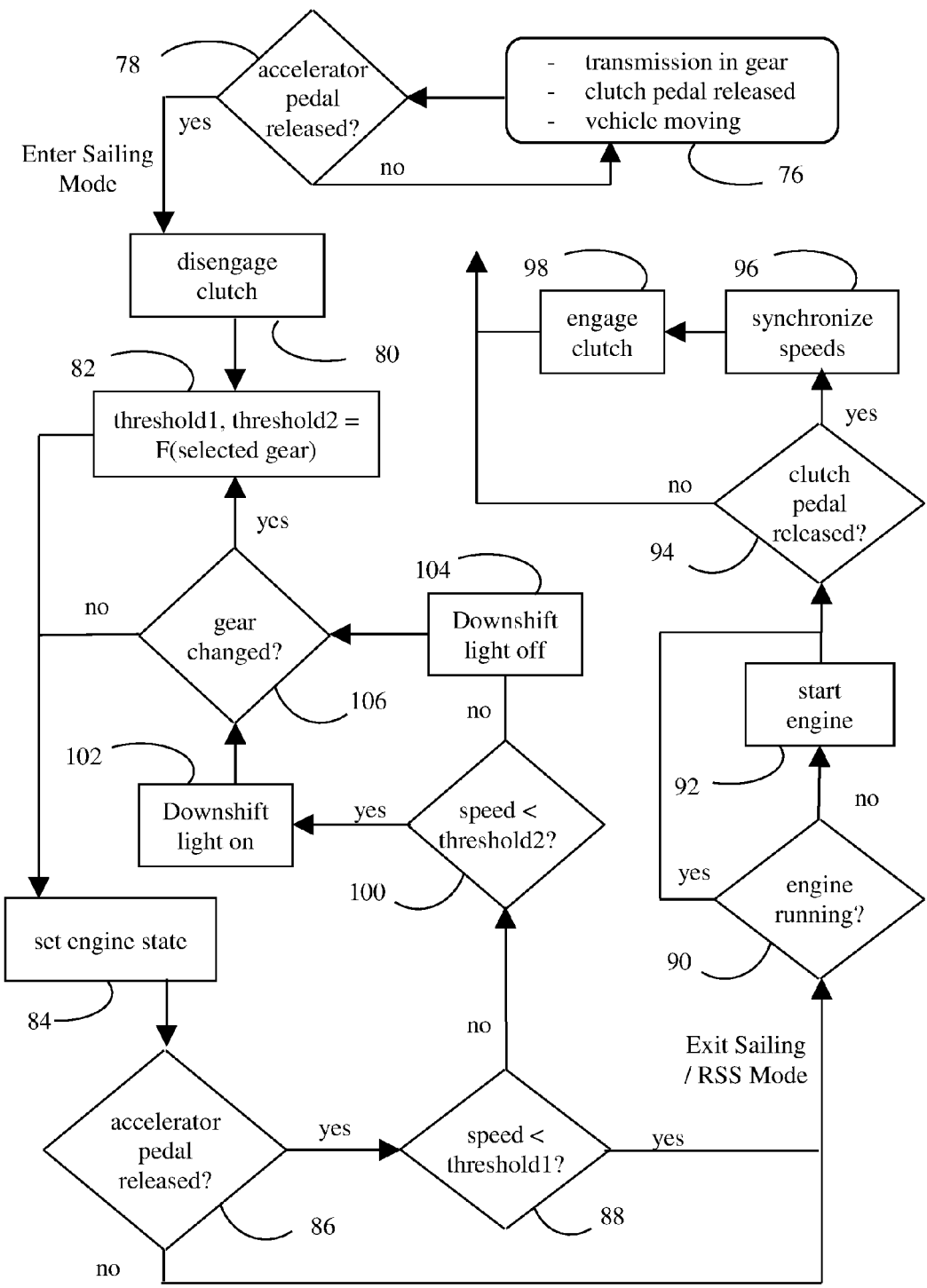
FIG. 4 is a flow chart for a method of operating a manual transmission clutch in a sailing or Rolling Stop/Start (RSS) mode.

FIG. 4 is a flow chart for controlling a transmission in a sailing/RSS mode. The method is initiated when entry conditions for sailing mode are satisfied. Specifically, sailing mode is entered in response to release of accelerator pedal 14 at 78 while gearbox 22 is in gear and clutch pedal 28 is released, such that clutch 20 is in an engaged state at 76. In some embodiments, there may be a delay following release of the accelerator pedal before entering sailing mode in order to avoid entering sailing mode for very short duration coasting events. At 80, the controller commands disengagement of clutch 20. At 82, the controller calculates two speed thresholds, each of which is a function of the selected gear ratio. The speed thresholds may reference vehicle speed, transmission output shaft speed, or other speeds that are proportional to vehicle speed. At 84, the controller commands the engine to a suitable state. In some cases, the engine is controlled to an idle speed. In other cases, the engine may be shut off. At 86, the controller checks whether the accelerator pedal is still in the released state. If so, at 88, the controller checks whether the speed has decreased below the first threshold.

If either the accelerator pedal has been depressed or the speed has decreased below the first threshold, the controller exits sailing/RSS mode. Exiting sailing/RSS mode is accomplished by returning the engine and clutch to the states corresponding to the current positions of accelerator pedal 14 and clutch pedal 28. If the engine has been shut down, as determined at 90, it is restarted at 92. If the clutch pedal is still released, as determined at 94, the engine speed is adjusted to match the gearbox input shaft speed at 96 and then the clutch is re-engaged at 98.

If the accelerator pedal is still released at 86 and the speed is above the first threshold at 88, then the controlled compares the speed to the second threshold at 100. The second threshold has a higher value than the first threshold. If the speed is less than the second threshold, then the downshift light is illuminated at 102 to encourage the driver to change to a lower numbered gear ratio (to produce a higher gearbox input shaft speed for a given vehicle speed). Otherwise, the downshift light is not illuminated at 104. If the driver has manipulated the shifter since the last iteration, as determined at 106, then the controller returns to 82 to revise the first and second thresholds.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    a gearbox configured to establish one of a plurality of speed ratios between a gearbox input shaft and an output shaft in response to manipulation of a shifter;
    an engine having a crankshaft;
    a friction clutch configured to selectively couple the gearbox input shaft to the crankshaft;
    an accelerator pedal;
    a clutch pedal; and
    a controller programmed to
        disengage the clutch in response to release of the accelerator pedal while the vehicle is moving and the clutch pedal is in a released state, and
        re-engage the clutch in response to a vehicle speed decreasing to less than a first threshold.

2. The vehicle of claim 1 wherein the first threshold is based on which of the plurality of speed ratios is currently established.

3. The vehicle of claim 2 wherein the controller is further programmed to revise the first threshold in response to manipulation of the shifter while the clutch is in a disengaged state with the clutch pedal in the released state.

4. The vehicle of claim 1 further comprising a downshift indicator and wherein the controller is further programmed to activate the downshift indicator in response to the vehicle speed decreasing to less than a second threshold while the clutch is in a disengaged state with the clutch pedal in the released state.

5. The vehicle of claim 4 wherein the second threshold is based on which of the plurality of speed ratios is currently established.

6. The vehicle of claim 1 wherein the controller is further programmed to
    stop the engine while the vehicle is moving, the clutch is in a disengaged state, and the clutch pedal is in the released state; and
    re-start the engine before re-engaging the clutch.

7. A transmission comprising:
    a gearbox configured to establish one of a plurality of speed ratios between a gearbox input shaft and an output shaft in response to manipulation of a shifter;
    a friction clutch configured to selectively couple the gearbox input shaft to an engine crankshaft; and
    a controller programmed to
        disengage the clutch in response to release of an accelerator pedal while the output shaft is rotating and a clutch pedal is in a released state, and
        re-engage the clutch in response to an output shaft speed decreasing to less than a first threshold.

8. The transmission of claim 7 wherein the first threshold is based on which of the plurality of speed ratios is currently established.

9. The transmission of claim 8 wherein the controller is further programmed to revise the first threshold in response to manipulation of the shifter while the clutch is in a disengaged state with the clutch pedal in the released state.

10. The transmission of claim 7 wherein the controller is further programmed to activate a downshift indicator in response to the output shaft speed decreasing to less than a second threshold while the clutch is in a disengaged state with the clutch pedal in the released state.

11. The transmission of claim 10 wherein the second threshold is based on which of the plurality of speed ratios is currently established.

12. A method of controlling a transmission comprising:
    disengaging a friction clutch in response to release of an accelerator pedal while an output shaft is rotating, a speed ratio is established between the output shaft and a gearbox input shaft, and a driver controlled clutch pedal is in a released state; and
    re-engaging the clutch in response to an output shaft speed decreasing to less than a first threshold.

13. The method of claim 12 wherein the first threshold is based on the speed ratio.

14. The method of claim 12 further comprising activating a downshift indicator in response to the output shaft speed decreasing to less than a second threshold while the clutch is in a disengaged state with the clutch pedal in the released state.

15. The method of claim 14 wherein the second threshold is based on the speed ratio.

* * * * *